UNITED STATES PATENT OFFICE.

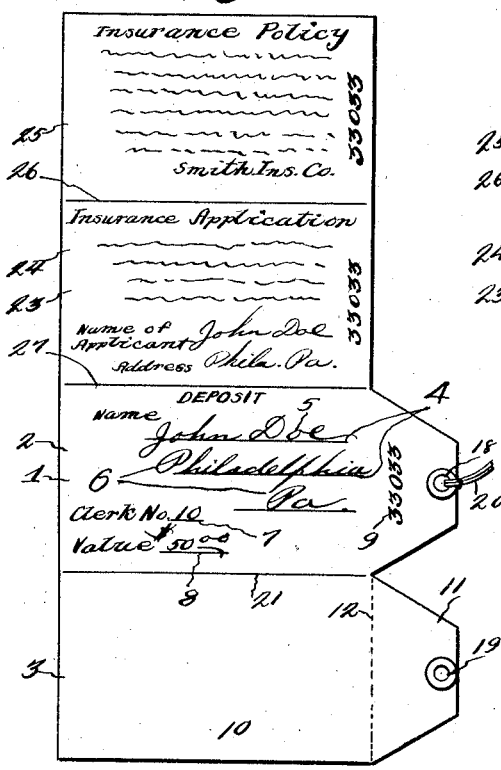

CHARLES A. FETTERS, OF WASHINGTON, DISTRICT OF COLUMBIA.

BAGGAGE-TAG.

1,384,457.   Specification of Letters Patent.   Patented July 12, 1921.

Application filed November 27, 1917. Serial No. 204,168.

*To all whom it may concern:*

Be it known that I, CHARLES A. FETTERS, citizen of the United States, residing at Washington, District of Columbia, have invented certain new and useful Improvements in Baggage-Tags, of which the following is a specification, reference being had therein to the accompanying drawing.

The invention relates to baggage tags and more particularly to tags used in hotels and other public places where articles are checked.

It is the object of the invention to provide a baggage tag, by the use of which, it will be impossible for the article to be given out to the wrong party by the clerk, and at the same time so construct the tag, so that when the article is checked, the depositor will sign his name on a deposit section and receive a numeraled coupon, upon the return of which he will again sign a receipt section of the tag, which is so attached and folded over the deposit section, that it will be impossible for him to see the signature on the deposit section. If both signatures agree the article is delivered to the holder of the numeraled coupon by the clerk.

A further object of the invention is to provide a baggage check so constructed that it will be impossible for the fraudulent holder of the numeraled coupon to obtain the article checked.

A further object is to construct a baggage check so that the hotel clerk or other checking agent will have a complete receipt containing the signature of the depositor and the number of the clerk who originally checked the article, also the clerk who compared the signatures of the depositor and delivered the checked article to the holder of the numbered coupon.

A further object is to provide a baggage check having similarly numbered deposit and receipt sections and a numbered coupon attached to one of the deposit or receipt sections.

A further object is to provide the tags with insurance application and policy sections.

In practical fields the details of the invention may necessitate alterations falling within the scope of what is claimed.

The invention comprises further features and combination of parts as hereinafter set forth, shown in the drawings and claimed.

In the drawings:—

Figure 1 is a plan view of the baggage check, showing an insurance application and policy attached thereto.

Fig. 2 is a plan view of the baggage check showing the receipt section folded over the deposit section.

Fig. 3 is a perspective view of the baggage check showing the same folded and the insurance application and policy folded between the deposit and receipt section, coupon being detached.

Fig. 4 is a perspective view of the baggage tag, showing the same attached to a piece of baggage.

Fig. 5 is a perspective view of a paper clip for holding the tag folded.

Referring to the drawings, 1 designates the baggage tag as a whole. The tag comprises two sections 2 and 3, section 2 being the deposit section and is provided with a series of lines 4, for the name 5 and address 6 of the depositor of an article. Section 2 is also provided with lines 7 and 8 for the number of the clerk checking the article and the value of the same. A number 9 is placed on the section 2, which number is the general numeral of all of the sections of the tag.

The receipt section 3, comprises two sections 10 and 11, the section 10 is the receipt section and the section 11 is the coupon part of the tag. These parts are integral, but a scored line 12 is provided, so that they may be easily separated when the coupon is delivered to the depositor of the article. The receipt section 10 is provided with a series of lines 13 for the signature and address of the depositor when he calls for and desires to obtain the article checked. It is also provided with lines 14 and 15 for the number of the clerk delivering the article to the depositor and the value thereof. A number 16 is placed on the receipt section 10, which corresponds with and is the same as the number 9 on the deposit section. The coupon section is provided with a number 17 which corresponds with and is the same as the numbers 9 and 16 on the deposit and receipt sections.

Both sections may be provided with apertures 18 and 19, the aperture 18 being for the reception of a string 20 whereby the check may be attached to the article checked while the aperture 19 may be used for filing the coupon.

When an article is checked, the depositor writes his name and address on the lines 4 of the deposit section 2 and the clerk fills in his number and the value of the article, after which the coupon is detached and delivered to the depositor of the article. The clerk then folds the receipt section over the deposit section on the line 21. When folded the two sections are secured together by a fastener of any suitable character, said fastener being designated by the numeral 22, he then ties the tag to the article checked. When the depositor desires to secure the article checked, he presents the coupon 11 to the clerk, who in turn will secure the article having the corresponding number thereon. The receipt section is then signed by the depositor, who is prevented from seeing the signature on the deposit section, for the reason that the receipt section, being folded over the deposit section, blanks the same. After the receipt section has been signed, the clerk compares the signatures and if correct delivers the deposited article to the depositor, the clerk then places his number on line 14 of the receipt and also, if desired, the value of the article.

The deposit section 2 is provided with an extension 23 which extension is divided into sections 24 and 25. The section 24 is for an application for insurance on the article, while the section 25 is for the insurance policy. The extension 23 is provided with scored lines 26 and 27 so that the sections 24 and 25 may be folded between the deposit and receipt sections 2 and 3 of the check, as plainly shown in Fig. 7 of the drawings. By so constructing a tag it will be seen that the depositor may insure his baggage and also it will be seen that a check is provided wherein it will be impossible for the article checked to be obtained by a fraudulent holder of the coupon.

The invention having been set forth, what is claimed as new and useful is:—

A baggage tag formed from a plurality of oblong shaped sections, scored lines between said sections and longitudinally disposed in relation to the sections, the adjacent oblong sections at one end of the plurality of sections being provided with apertured projecting portions adapted to extend beyond the ends of the other oblong sections when disposed between the sections having the projections, the apertured projections being so positioned that when they are folded on each other the apertures will register and detachable means passing through said apertures for holding the tag in folded position.

In testimony whereof I hereunto affix my signature.

CHARLES A. FETTERS.